United States Patent [19]

Bates

[11] 4,161,771
[45] Jul. 17, 1979

[54] INVERTER RIPPLE REGULATOR

[75] Inventor: James W. Bates, Palos Verdes Estates, Calif.

[73] Assignee: Gulton Industries, Inc., Metuchen, N.J.

[21] Appl. No.: 818,350

[22] Filed: Jul. 25, 1977

[51] Int. Cl.² ............................................ H02M 1/12
[52] U.S. Cl. ........................................ 363/43; 363/71; 363/97; 363/101
[58] Field of Search ...................... 307/82; 363/43, 65, 363/71, 72, 95–97, 101

[56] References Cited

U.S. PATENT DOCUMENTS

| | | | |
|---|---|---|---|
| 3,233,165 | 2/1966 | Bedford | 363/101 X |
| 3,328,664 | 6/1967 | Baude | 363/71 |
| 3,559,031 | 1/1971 | Vigna | 363/101 X |
| 3,644,819 | 2/1972 | Jackson | 363/101 |
| 3,979,662 | 9/1976 | Klein | 363/71 |

*Primary Examiner*—William M. Shoop
*Attorney, Agent, or Firm*—Wallenstein, Spangenberg, Hattis & Strampel

[57] ABSTRACT

A sinusoidal-like output is obtained from a source of DC by adding the outputs of two or more DC to AC inverters, producing flat-topped pules combining to provide a normally near ideal stepped sinusoidal-like waveform, with the output of a buck-boost circuit which produces bucking or boosting outputs of one polarity or another when voltage regulation is called for or a zero output when no regulation is called for. The operation of the buck-boost circuit preferably is controlled by a circuit which responds to the combinations of polarities of voltages obtained at two signal tap-off points of a bridge circuit including first and second input terminals between which terminals and a common terminal are connected in opposite phase a low power, low amplitude ideal sinusoidal reference signal and a proportionate part of the filtered combined outputs of the inverter and buck-boost circuits, the magnitude of the combined signal output at said second terminal being selected to normally match that of said reference signal at said second output terminal. A series circuit of a number of impedance means are connected between said signal input terminals, and said tap-off points are made at points along said series circuit of impedance means which are symmetrically related with respect to an intermediate impedance point therebetween which is at zero potential with respect to said common terminal when the reference signal and combined signal output at said first and second input terminals are of equal value.

17 Claims, 9 Drawing Figures

Fig. 5
| REF. SINEWAVE 1/2 CYCLE | CONDITIONS | BRIDGE TAP-OFF CIRCUIT | | COMPARATORS | | BUCK-BOOST CIRCUIT MODES |
|---|---|---|---|---|---|---|
| | | A | B | X | Y | |
| + | $V_r = V_0$ | + | − | 1 | 1 | BYPASS |
| + | $V_r > V_0$ | + + | + | 1 | 0 | BOOST |
| + | $V_r < V_0$ | − | − − | 0 | 1 | BUCK |
| − | $V_r = V_0$ | − | + | 0 | 0 | BYPASS |
| − | $V_r > V_0$ | − − | − | 0 | 1 | BOOST |
| − | $V_r < V_0$ | + | + + | 1 | 0 | BUCK |
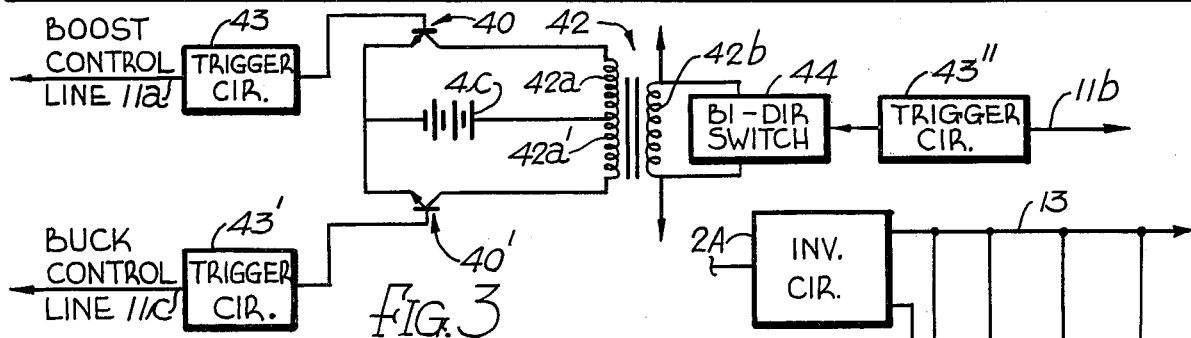
Fig. 3
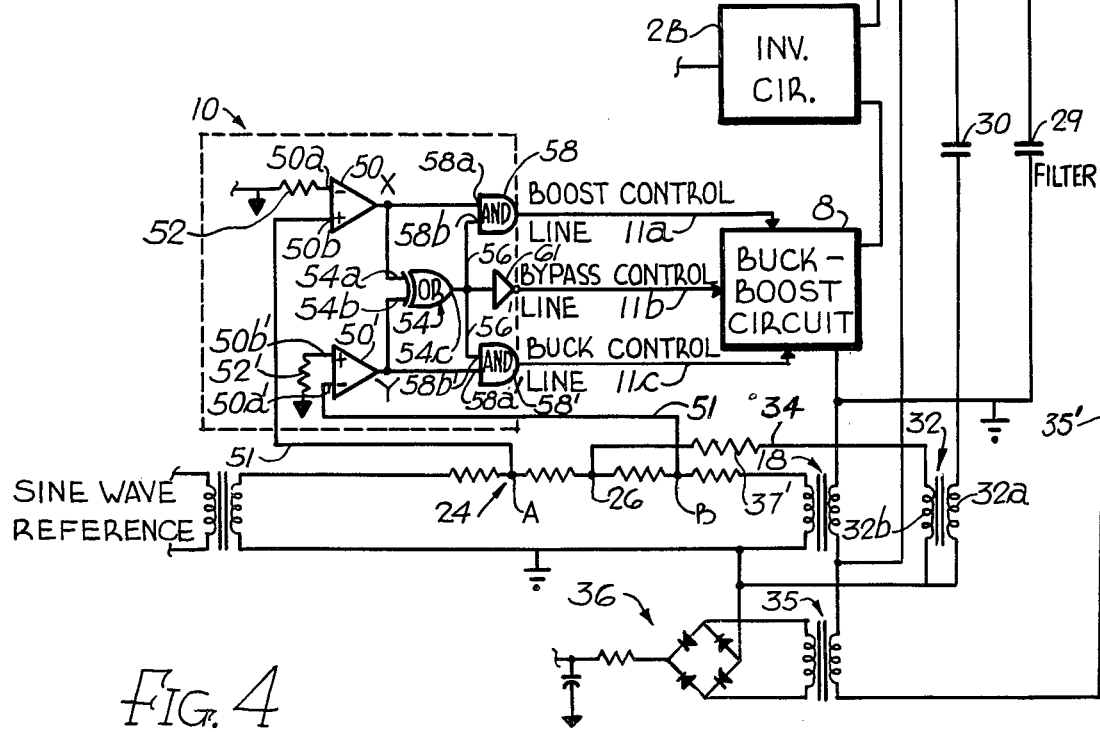
Fig. 4

INVERTER RIPPLE REGULATOR

BACKGROUND OF THE INVENTION

This invention relates to the generation of AC power, preferably of sinusoidal waveform, from DC, as is common in the power systems of airborn vehicles. In recent years, power converter systems have been developed which produce sinusoidal AC power by filtering the combined outputs of two or more DC to AC inverters producing flat-topped voltages of varying width and/or phase to produce a stepped sinusoidal-like waveform which can be easily filtered into a near ideal sinusoidal voltage waveform. U.S. Pat. No. 3,579,081 discloses one such converter system found especially useful for this purpose. Generally, the individual DC to AC inverters utilize one or more regulated DC power supplies. Such power supplies sometimes comprise DC to DC inverter circuits to produce DC of the desired value which may be greater than the output of the available DC battery or other DC power source. To maintain the voltage of the AC output of such converter systems under widely varying load conditions or under transient conditions has heretofore proposed problems in the design of such equipment. While various regulating techniques have been satisfactory under various slowly varying or static load conditions, the prior art has left much to be desired from the standpoint of cost and efficiency when the specifications require regulation under transient or other rapidly varying load conditions. The power system of U.S. Pat. No. 3,581,212, represents one attempt to produce a regulated stepped waveform for DC to AC converter systems which is supposed to respond reasonably quickly to rapidly varying load and other conditions.

An object of the present invention is to provide a fast response regulated DC to AC power converter system which is an improvement over that disclosed in U.S. Pat. No. 3,581,212 in that it is a less costly and more efficient regulated power converter system. (The converter circuit disclosed in this patent obtains a desired regulated sinusoidal-like output by continuously switching in and out one or more regulated inverter circuits which supply appreciable proportions of the power of the desired ideal signal under control of circuits which generate ideal upper and lower signal limits and compare the same with a signal derived from the converter circuit output.)

SUMMARY OF THE INVENTION

In accordance with one of the features of the present invention, the converter system produces a sinusoidal-like voltage wavefore by filtering the stepped sinusoidal waveform output preferably produced by combining the outputs of two or more DC to AC inverter circuits, preferably, although not necessarily, in the manner disclosed in said U.S. Pat. No. 3,579,081. In the most advantageous form of the present invention, a much faster responding and more efficient regulated power converter circuit is achieved by utilizing a buck-boost circuit which adds or subtracts a relatively small voltage to or from the output of the DC to AC inverter circuits when the inverter circuits do not produce their intended ideal sinusoidal output. The buck-boost circuit is designed to act instantaneously when an output is called for to produce an output of one polarity or another for bucking or boosting the output of the DC to AC inverter circuits. Because its output is only a small fraction (i.e. much less than 40 percent, and preferably less than 15–20 percent) of the amplitude of the normal output voltage of the converter circuit when it produces an output, only a small amount of power is expanded for regulating purposes. A small amount of hysteresis is preferably designed into the buck-boost circuit so that once its control operation is called for its instantaneous response lasts at least a given finite but small period, so that the buck-boost circuit is responsive to changes in circuit conditions preferably as much as 10 to 30 times throughout each half cycle of operation of the main converter circuit.

In accordance with another feature of the invention, the operation of the buck-boost circuit is controlled by a comparison circuit which preferably compares only a fraction of the converter circuit output with a reference sine wave signal of a proportionate value of the desired output of the converter circuit, so that the comparison circuit operates at low power levels and small signal levels where fast circuit operation is more readily achievable. Other features of the invention relate to unique details of the comparator circuit and control circuit responding thereto which greatly simplifies the circuitry required to control the buck-boost circuit.

Still another feature of the invention relates to a unique feedback circuit which feeds back to the comparator circuit any ripple component in the converter circuit output to increase the speed of response of the circuit controlling the buck-boost circuit. Still another feature of the invention deals with the manner in which regulation is achieved under slowly varying conditions as were the output of the DC power source varies from time to time. In accordance with this aspect of the invention, the magnitude of the reference sinusoidal signal is varied in accordance with the average value of the converter circuit output signal.

DESCRIPTION OF DRAWINGS

FIG. 3 is a circuit diagram of the buck-boost circuit shown in box form in FIG. 4;

FIG. 4 shows a portion of the circuit shown in FIG. 1 and includes a circuit diagram for the preferred buck-boost control circuit shown in box form in FIG. 1; and FIG. 5 is a chart showing the binary and voltage polarity signals at the input and other points of the buck-boost control circuit and the functions achieved thereby.

DESCRIPTION OF EXEMPLARY EMBODIMENT OF THE INVENTION

Figure 1:
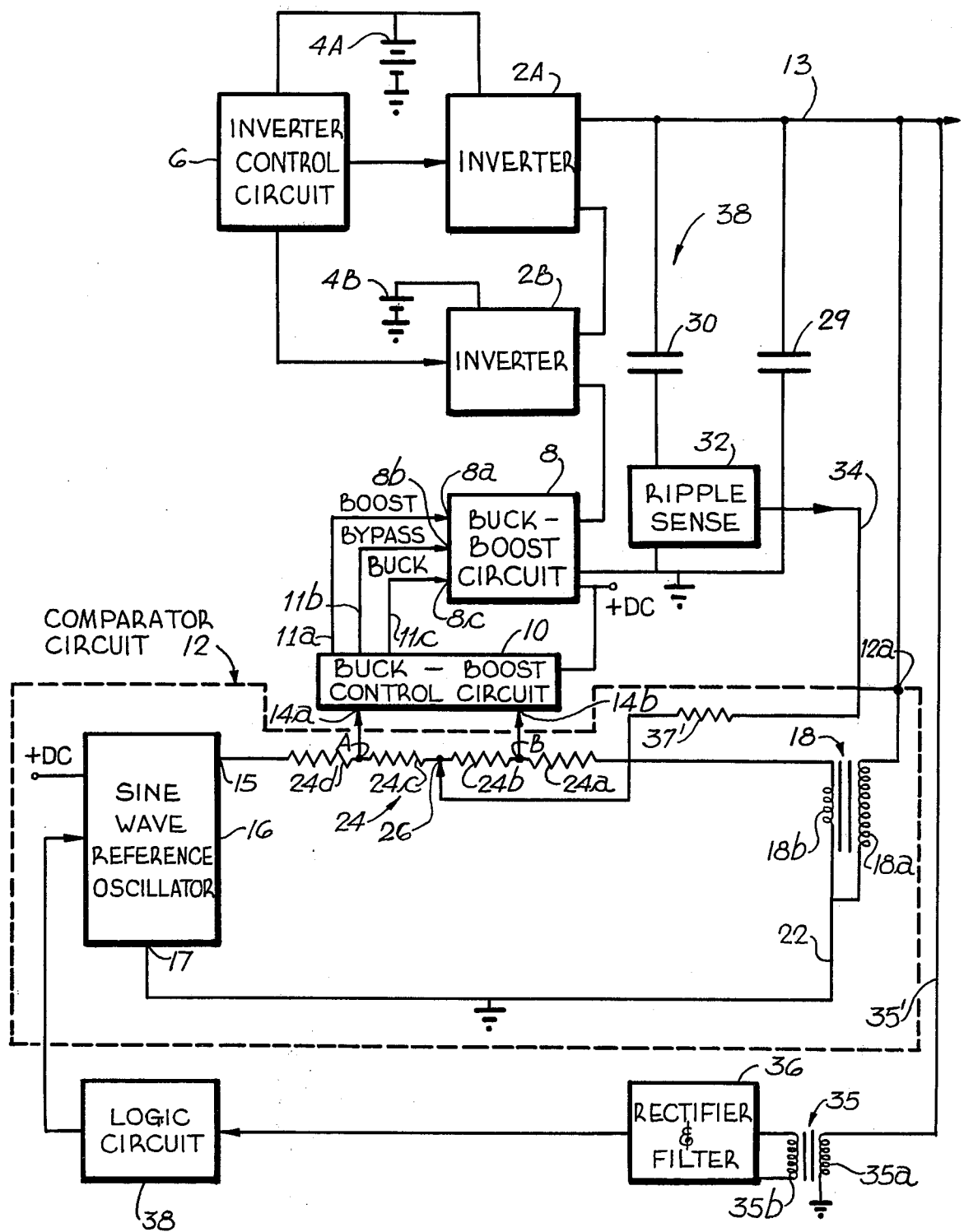
FIG. 1 is a diagram, partially in box form, of the inverter ripple regulator circuit constituting the preferred form of the invention.
Figure 2A:
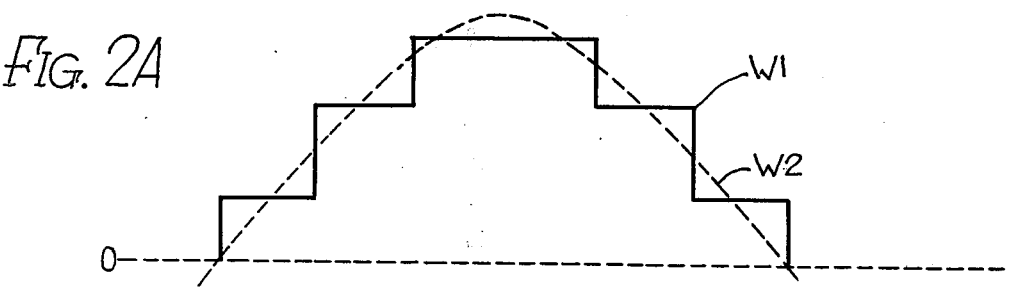
FIG. 2A, 2B, 2C, 2D and 2E are respectively waveforms of signals which may be present in different portions of the circuit shown in FIG. 1, and drawn to a common time base.

Refer now more particularly to FIG. 1, there is shown in box form inverter circuits 2A and 2B which generate flat-topped voltages each varying between identical positive and negative values so that when the outputs thereof are added together they form roughly a stepped sinusoidal waveform like W1 in FIGS. 2A which has three steps. Of course, more than two inverter circuits may be utilized to produce a stepped sinusoidal waveform having many more than three or four steps (four steps being obtainable with only two inverter circuits when the outputs thereof have the waveforms shown in FIG. 4 in said U.S. Pat. No. 3,579,081). The inverter circuits 2A and 2B are energized from sources 4A and 4B of DC voltage. The voltage source 4A also energizes an inverter control circuit 6 which operates and synchronizes the inverter circuits 2A and 2B. Exemplary circuitry for the inverter circuits 2A and 2B are found in said U.S. Pat. No. 3,579,081. While a desirable sine wave output may be achieved by simply filtering the combined outputs of the inverter circuits 2A and 2B, to form a near ideal sine wave, the inverter circuits shown will not provide a properly regulated sine wave output under rapidly varying load or other transient conditions unless special circuitry like that supplied by the present invention is utilized to achieve proper regulation of the output of the inverter circuits. While some aspects of the invention have application to the generation of sine wave voltages of modest power levels, the principal and most important application of the present invention is in DC to AC power converter systems having particular utility in airborne vehicles, although the invention is also useful for any DC to AC converter power supply application.

In accordance with the present invention, the outputs of the inverter circuits 2A and 2B are also combined with the output of a buck-boost circuit 8 which has three different modes of operation. In one of these modes of operation, the buck-boost circuit 8 instantaneously generates a voltage of predetermined value and a polarity which will increase or boost the voltage then produced by the combined outputs of the inverter circuits 2A and 2B preferably by a small fraction of the peak value of the stepped sinusoidal waveform voltage produced by the converter circuit. In another mode of operation of the buck-boost circuit 8, the circuit instantaneously produces a voltage of said predetermined value and a polarity which will oppose or buck the voltage then produced by the combined outputs of the inverter circuits 2A and 2B. In the third mode of operation of the buck-boost circuit 8, the circuit generates no voltage and acts as a bypass where the outputs of the inverter circuits 2A and 2B are arranged in series circuit relation, as shown in FIG. 1.

The particular mode of operation of the buck-boost circuit 8 is determined by signals received thereby from a buck-boost control circuit 10 to be described. This control circuit receives control signals from a comparator circuit 12 which compares the output of the entire converter circuit shown with a reference sine wave signal, such as produced by a sine wave reference oscillator 16. The combined output voltage of the converter circuit illustrated is taken between an output line 13 and ground, and the voltage on the line 13 is fed to an input terminal 12a of the comparator circuit 12. The preferred comparator circuit 12 produce signals upon output lines 14a and 14b which may be voltages having different combinations of polarities indicating whether or not at any given instant the output of the converter circuit is at, above, or below the desired value of an ideal sine wave output. While in accordance with the broadest aspect of the invention, the comparator circuit 12 may take a number of different forms, it most advantageously is a unique bridge-type circuit shown in FIG. 1.

The output of the reference oscillator 16 appears across output terminal 15 and a terminal 17 connected to ground. The peak value of the output of the oscillator 16 is preferably a small fraction of the output of the converter circuit. For example, the peak value of the oscillator output may be 16 volts, assuming the desired peak value of the converter circuit is 160 volts. The output of the oscillator 16 is compared with a fractional part of the combined output of the inverter and buck-boost circuits 2A, 2B and 8. To this end, a step-down transformer 18 is provided having a primary winding 18a with one end connected to the comparator circuit input terminal 12a and the other end connected by line 22 to ground. The transformer has a secondary winding 18b with one end connected to the grounded line 22 and the other end extending to a network of impedance elements, preferably resistors 24a, 24b, 24c and 24d, connected in series between the ungrounded output terminal 15 of reference oscillator 16 and the ungrounded end of the transformer secondary winding 18b. The middle resistors 24b and 24c, which connect at the network center point 26, are of an identical small value (e.g. 10 ohms) relative to the outermost resistors 24a and 24d, which are of identical value (e.g. 1000 ohms). The juncture of resistors 24c and 24d on the oscillator side of the center point 26 forms one tap-off point A to which the output line 14a extends, and the juncture of resistors 24a and 24b on the transformer side of the center point 26 forms another tap-off point B to which the output line 14b extends. The connections of the secondary winding 18b into the circuit described is such that the voltage across the secondary winding is in opposed relation to the output of the oscillator 16 considering the circuit a bridge circuit comprising parallel branches between the center point 26 and ground. When considering the circuit as a single loop circuit defined by the secondary winding 18b, the oscillator 16, and the resistors 24a, 24b, 24c and 24d, the outputs of the oscillator 16 and secondary winding are in additive relation.

It should now be apparent that when the instantaneous value of the voltage at the output of the oscillator 16 is identical to the instantaneous value of the voltage across the secondary winding 18b, the voltage at the center point 26 of the resistor network is at ground potential and the voltage at the tap-off point A will be identical in value and of opposite polarity to the voltage at the tap-off point B, and the polarities of the voltages at the tap-off points A and B are the same as the polarities of the outputs respectively of the oscillator 16 and secondary winding 18b. However, since the center resistors 24b and 24c are of extremely small value in comparison to the outmost resistors 24a and 24d, when the magnitude of the outputs of the oscillator and secondary winding 18b at any instant are dissimilar beyond a given very small value (e.g. 0.05 volts), the polarity of the voltages at the tap-off points A and B (relative to ground) will be the same as that of the larger of these outputs. Since the polarity of the outputs of the oscillator 16 and secondary winding 18b inverts each half cycle, the pattern of voltages at the tap-off points A and B will invert each half cycle as shown by the chart of FIG. 5 for each of the signal conditions indicated therein (i.e. where the output Vr of the reference oscillator 16 is equal to, greater than, or less than the output of Vo of the secondary winding 18b). Under the three voltage comparison conditions, the buck-boost circuit 8 should be operated respectively in the bypass, boost, and buck modes of operation. (The double plus and double negative signs shown in columns A and B of the chart of FIG. 5 designate merely that the positive or negative voltages involved are somewhat greater than the voltage designated by a single plus or negative sign.)

Figure 2B:
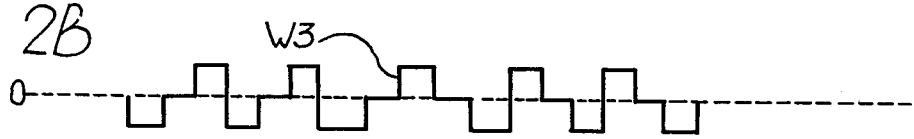
Figure 2C:
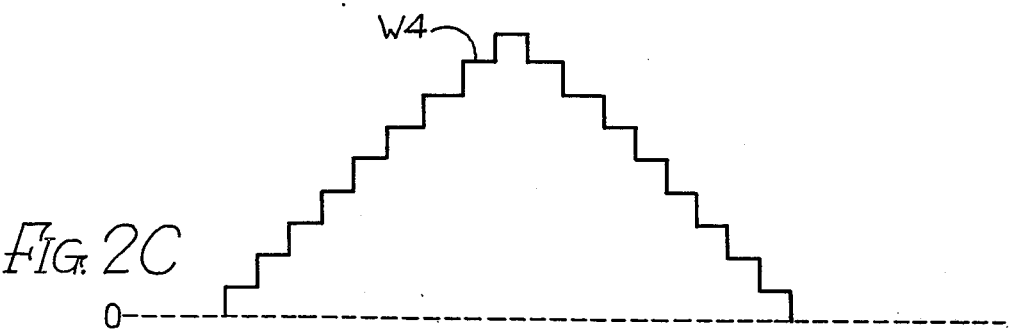
Figure 2D:
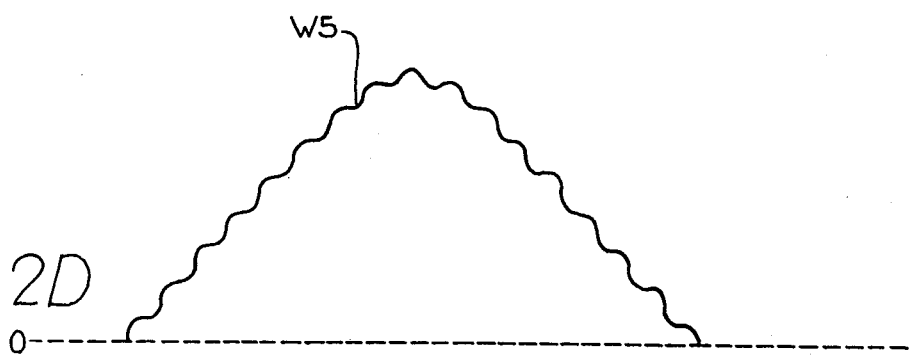

Once the buck-boost control circuit 10 receives a given combination of voltages from the output lines 14a and 14b, it responds immediately to energize one of the lines 11a, 11b or 11c identified as the boost, bypass or buck control lines, to operate the buck-boost circuit 8 in a boost, bypass or buck mode of operation, depending upon the requirements of the comparator circuit 12 for bringing the secondary winding output 18b toward the value of the output on the oscillator 16 at the particular instant of time involved. Once the buck-boost circuit 8 receives a signal of one of the control lines 11a, 11b or 11c, the circuit has a hysteresis or time delay which enables the circuit to operate in the particular mode for a finite time, even though the control circuit 10 shifts its control signal to another control line. However, this hysteresis still permits the buck-boost circuit 8 to change its output as much as 10 to 30 or more times each half cycle. Sometimes, the magnitude of the buck or boost voltage generated by the buck-boost circuit 8 causes the output voltage of the converter circuit continuously to alternate between points above and below the ideal sine wave W2 shown in FIG. 2A, as shown by waveform W5 in FIG. 2D, which represents the voltage present between the converter circuit output line 13 and ground when the output is imperfectly filtered by a capacitor 29 connected therebetween. This filter capacitor may also be designed to provide a near smooth ideal sine wave like waveform W2. The first half cycle of an exemplary output waveform W3 from the buck-boost circuit 8 is shown in FIG. 2B. (The waveform thereof for the second half cycle is the mirror image of the first half cycle thereof.) When this output is added to the assumed combined outputs of inverter circuits 2A and 2B (waveform W1 in FIG. 2A) the unfiltered combined output of the inverter and buck-boost circuits will be the waveform W4 in FIG. 2C.

Figure 2E:

It should be noted that the circuit just described will react initially instantaneously to a sudden change in load conditions or the presence of a transient voltage in the output of the converter circuit, to operate the buck-boost circuit 8 in a mode of operation to stabilize the output voltage. To increase the speed of response of the circuit, another feature of the invention illustrated in FIG. 1 is to inject the ripple component W6 (FIG. 2E) of the waveform W5 into the comparator circuit 12. To this end, the ripple component is separated from the rest of the converter circuit output by a capacitor 30 connected between the ungrounded converter circuit output line 11 and a ripple sensing impedance 32 which, in turn, is connected to ground. The impedance 32 preferably acts as a resistor across which the ripple component W6 in FIG. 2E of the output waveform appears leading by 90 degrees the switching of the buck-boost circuit output. (The current and voltage across a resistor in series with a capacitor leads the applied sinusoidal voltage by 90 degrees.) The impedance 32, as shown in FIG. 4, is a transformer having a primary winding 32a connected between capacitor 30 and ground and a secondary winding 32b is connected between ground and one end of a resistor 37' by a line 34. The other end of resistor 35 is connected to bridge center point 26. Accordingly, the ripple component is applied between the center point of the resistor network and ground to a degree depending on the value of resistor 37'.

Regulation of the average output voltage of the converter circuit may be achieved by controlling the amplitude of the output of the reference oscillator 16 in accordance with the variations of the available output of the converter circuit. Accordingly, a line 35' is connected between the ungrounded output line 13 of the converter circuit and one end of the primary winding 35a of a transformer 35 whose other end is grounded. The transformer 35 has a secondary winding 35b coupled to a rectifier and filter circuit 36 which develops a DC output which varies with the average value of the converter circuit output. The DC output of the rectifier and filter circuit 36 is fed to a control circuit 38 which then controls the reference oscillator circuit 16 to vary the output thereof in a direction which will cause the buck-boost circuit 8 to operate in a direction which tends to stabilize the average output of the converter circuit. For example, if the average output of the converter circuit increases, the DC output of the rectifier and filter circuit 36 will increase. Control circuit 38 then acts to decrease the output of the reference oscillator 16, so that the comparator circuit 12 will automatically operate the buck-boost circuit 8 in a buck mode of operation to decrease the combined output of the converter circuit.

Refer now to FIG. 3 which shows an examplary circuit for the buck-boost circuit 8 with the aforementioned control lines 11a, 11b and 11c extending thereto. In this exemplary circuit when boost, bypass and buck operations are called for, the control lines 11a, 11b and 11c will respectively receive a positive 1 binary signal. Schmitt trigger circuits 43 and 43' which produce a fixed positive output voltage as long as the input voltage thereto exceeds a given positive threshold level. A similar trigger circuit 43" is coupled to control line 11b. Accordingly, as long as the circuit calls for a buck, boost or bypass operation within any given half cycle, the Schmitt trigger circuit 43, 43' or 43" will generate a positive output which, because of the well known hysteresis in such circuits, will remain for a finite period even though the control signal fed thereto should drop below this threshold level.

The output of the Schmitt trigger circuits 43 and 43' are respectively coupled to the bases of NPN transistors 40 and 40', the emitters of which are coupled to the negative terminal of DC voltage source 4C. The collectors of the transistors 40 and 40' are connected to the opposite ends of a center-tapped primary winding 42a-42a' of a transformer 42. The transformer has a secondary winding 42b whose outer ends are coupled to the opposite ends of a bi-directional switch 44 of any suitable type, which will short circuit the secondary winding 42b when a control signal appears on the bypass control line 11b. The Schmitt trigger circuit 43" is shown coupled between control line 11b and the switch 44. When a positive signal appears on the boost control line 11a, the Schmitt trigger circuit 43 couples to the base of positive voltage transistor 40 which then conducts to cause current to flow in one direction through the primary winding half 42a, to induce a voltage in the secondary winding 42b of a given polarity. When a positive control signal appears on the buck control line 11c, Schmitt trigger circuit 43' operates similarly to cause the transistor 40' to conduct current which flows in the opposite direction through the primary winding half 42a' to induce a voltage of opposite site polarity in the secondary winding 42b. When a positive control signal appears on the bypass control line 11b, Schmitt trigger circuit 43" closes the switch 44.

It should be noted that even when the reference voltage output of the oscillator 16 and the output of the secondary winding 18b have appreciably different values, because the waveforms are 180° out of phase or in phase depending on one's frame of reference, once every half cycle they will have approximately the same value as the sinusoidal voltages involved approach and pass through zero. Then the voltage conditions are such that the Schmitt trigger circuits 43 and 43′ will produce no positive outputs and the transistor 40 and 40′ will both be non-conductive to reset the buck-boost circuit.

The buck-boost circuit as just described, serves primarily the function of a voltage regulation since it was assumed that the outputs of the inverter circuits 2A and 2B together with the filter 29 normally produce the desired ideal sinusoidal waveform. However, if the output of the inverter circuits 2A and 2B and/or the filter 29 are designed so that the resultant filtered output is an imperfect sinusoidal waveform, such as one having substantial ripple therein equal to the number of steps produced by the outputs of these inverters, then the buck-boost circuit serves the function of continuously reducing the filtering necessary to produce an ideal sinusoidal waveform by filling in the gaps between the rippled output referred to. In such case, the buck-boost circuit responds to each step of the rippled output to at least double the ripple frequency and reduce the amplitude of the deviation thereof from the ideal sine wave (provided the buck-boost circuit is designed to generate the required small positive or negative voltage required merely to fill in the gaps referred to).

For best circuit efficiency and fast response, as previously indicated, the magnitude of the voltage produced by the buck-boost circuit is preferably only a small fraction of the peak value of the combined outputs of the inverter circuits 2A and 2B, preferably less than 15–20 percent thereof. The power used by the buck-boost circuit is thus a small percentage of the power supplied by the circuit and the lower voltage levels involved enable the circuit to respond more quickly to the varying circuit conditions.

Refer now to FIG. 4 which shows the preferred buck-boost control circuit 10 which effects the generation of control signals on the control lines 11a, 11b and 11c under the various combinations of voltage conditions at the tap-off points A and B of the resistor network 24. Reference will also be made to the chart of FIG. 5 during the description of the control circuit 10 now to be described.

The circuit 10 includes a pair of operational amplifiers 50 and 50′ having respectively the usual positive and negative input terminals 50a–50b and 50a′–50b′. As is well-known, when the positive input terminal of an operational amplifier is positive with respect to the negative input terminal (or the negative input terminal is negative with respect to the positive input terminal), the amplifier produces a positive output. When the negative input terminal thereof is positive with respect to the positive input terminal, the amplifier produces a negative output voltage. Conductors 51 and 51′ respectively extend between the tap-off points A and B of the resistor network 24 and the positive input terminal of the operational amplifier 50 and the negative terminal of the operational amplifier 50′. The negative input terminal of the operational amplifier 50 is connected by a resistor 52 to ground, and the positive input terminal 52b′ of the operational amplifier 50′ is connected by a resistor 52′ to ground. Consider first the voltage conditions at the tap-off points A and B under the conditions where the value of the output (Vr) of the reference oscillator 16 at a given instant of time is exactly equal to the value of the output at the secondary winding 18b and the voltages at the tap-off points A and B are respectively positive and negative. Since the input terminal 50b of operational amplifier 50 will be positive relative to the grounded negative input terminal 50a thereof, the output of the operational amplifier 50 at its output terminal X will be positive, which will be assumed to represent the binary signal 1. Under the voltage conditions just described, the negative input terminal 50a′ of the operational amplifier 50′ will then be negative with respect to the positive input terminal 50b′ so that the output terminal Y of operational amplifier 50′ will then be positive.

Consider now the signal conditions during the first half cycle of the sine wave signal involved (represented by the plus sign in the chart of FIG. 5), where the output (V$_r$) of the reference oscillator 16 is greater than the value of the output (Vo) of the secondary winding 18b. Then the tap-off point A will be a positive voltage greater than the positive voltage which then also appears at the tap-off point B. Since the voltage at the positive input terminal 50b of operational amplifier is then positive with respect to the voltage at the negative input terminal 50a thereof, the voltage at its output terminal X will be positive representing the binary signal 1 as before. However, the positive voltage appearing at the tap-off point B applied to the negative input terminal 50a′ of the operational amplifier 50′ will now produce a negative voltage at the output terminal Y of the operational amplifier 50′, which negative voltage represents the binary signal 0. Based on the explanations of the output voltage conditions already described for the operational amplifier, the information given by the rest of the chart of FIG. 6 for the various other amplitude conditions of the outputs of the reference oscillator 16 and the secondary winding 18b will be apparent. It should be noted that the output conditions of the operational amplifiers 50 and 50′ for the various relative amplitude conditions of V$_r$ and V$_o$ referred to are completely opposite to one another during the positive and negative half cycles of the compared sine wave signals. Thus, when V$_r$ equals V$_o$, the binary signals at the output terminals X and Y of the operational amplifiers are 1-1 during each plus half cycle, and 0-0 during each negative half cycle. Similarly, for the condition V$_r$ is greater than V$_o$, the binary signals at the output terminals X and Y are 1-0 respectively during each positive half cycle and 0-1 during each negative half figure. When V$_r$ is less than V$_o$, the binary signals at the output terminals X and Y are respectively 0-1 during each positive half cycle and 1-0 during each negative half cycle.

The binary output signals at the output terminals X and Y of the operational amplifiers 50 and 50′ are converted to signals necessary to energize the control lines 11a, 11b and 11c in a manner summarized by the chart of FIG. 6 simply by the use of an exclusive "OR" gate 54, a pair of "AND" gates 58 and 58′ and an inverter 61 connected in the manner shown in FIG. 5. Accordingly, the output terminals X and Y are connected respectively to the separate inputs of the exclusive "OR" gate 54 which produces a positive (i.e. binary 1) output if either one of its inputs has a binary 1 signal thereon, and produces a zero or negative binary 0 output when both of its inputs have binary 1 or 0 signals thereon. The output terminals X and Y are also connected respectively to input terminals 58a and 58a′ of the "AND" gates 58 and 58′, and the output of the exclusive "OR"

gate 54 is connected to the other input terminals 58b and 58b' of the "AND" 58 and 58' and to the inverter 61. In such an arrangement it can be seen that the boost signal control 11a connected to the output of "AND" gate 58 will receive a positive or binary 1 signal when the reference voltage $V_r$ is less than the secondary winding voltage $V_o$, the bypass control line 11b connected to the output of the inverter 61 will receive a positive or binary 1 signal when the reference voltage $V_r$ equals the secondary winding voltage $V_o$, and the buck signal control line 11c will receive a positive or 1 binary signal when the reference voltage $V_r$ is greater than the secondary winding voltage $V_o$.

The present invention has thus provided a very reliable, fast acting and efficient regulated DC to AC converter circuit, the converter circuit which, in the preferred form of the invention, utilizes DC to AC inverter circuits generating a stepped sinusoidal waveform. Since the buck-boost circuit and related circuits provide voltage regulation under both rapidly varying and slowly varying circuit conditions, the DC to AC inverter circuits need not be supplied by regulated DC sources as in the case of conventional inverter circuits utilized to produce a stepped sinusoidal waveform.

The converter circuit of the present invention is applicable to a multi-phase converter circuit by duplicating the circuitry described for each of the outputs of the multi-phase circuit.

It should be understood that numerous modifications may be made in the most preferred form of the invention described without deviating from the broader aspects of the invention.

I claim:

1. A converter circuit for providing a regulated sinusoidal-like output voltage under varying load current conditions from DC, said converter circuit comprising, in combination: DC voltage source means; a source of a reference signal having the desired sinusoidal-like waveform; inverter circuit means energized by said DC voltage source means for providing an output which at least roughly approximates a desired sinusoidal-like output, a buck-boost circuit having a first output condition where the output thereof is a first finite signal of one polarity which is a fraction of the maximum amplitude of said output, a second output condition where the output thereof is a second finite signal of the same amplitude but opposite polarity to said first finite signal, and a third output condition where the output thereof is zero; means for adding the output of said buck-boost circuit to the output of said inverter circuit means to produce an overall combined output; comparator means for comparing the output of said reference signal source and at least a part of said overall combined output of said inverter circuit and buck-boost circuits which has an amplitude comparable to said reference signal; and control means responsive repeatedly over each half cycle to said comparator means for operating said buck-boost circuit into one of said output conditions for a desired period which brings said overall resultant output toward the instantaneous level of the desired sinusoidal output.

2. The converter circuit of claim 1 wherein the value of said finite signals of said one and opposite polarities is such as to cause said overall combined output of said inverter circuit means and buck-boost circuit to alternate on opposite sides of the desired sinusoidal-like output to provide a relatively high frequency ripple upon an envelope following the waveform of the desired output.

3. The converter circuit of claim 1 wherein said comparator circuit has output terminal means, and means for providing (a) a first output signal condition on said output terminal means when the instantaneous value of the reference signal is above said overall combined output compared therewith, (b) a second output signal condition on said output terminal means when the instantaneous value of said reference signal is below said overall combined output compared therewith, and (c) a third output signal condition on said output terminal means when the instantaneous value of said reference signal is equal to said overall combined output compared therewith, and said control means comprising means for operating said buck-boost circuit respectively in said first and second output conditions when said first and second output signal conditions are present at the output terminal means of said comparator means and for operating said buck-boost circuit to produce said zero output condition when said third output signal condition is present at the output terminal means of said comparator means.

4. The converter circuit of claim 1 wherein said comparator means is a bridge-type circuit having first and second signal input terminals and a common point, means for coupling said at least part of said overall combined output between said first input terminal and said common terminal so that the magnitude of the input signal thereat is comparable to said reference signal, and a series circuit of impedance means connected between said first and second input terminals and having first and second tap-off points therealong which are symmetrically related with respect to an intermediate impedance point therebetween which is at zero potential with respect to said common point when the amplitude of the component of said combined output at said first input terminal is equal in value but opposite in polarity to the reference signal at said second input terminal, and means for coupling said reference signal between said second input terminal and said common terminal in an opposite phase to the connection of said overall combined output to said first input terminal so that a loop circuit is formed including said impedance means and said various terminals, and wherein the reference signal and the portion of said overall combined output in the loop circuit produces voltages of opposite polarity at said tap-off points when they are equal in value and voltages of the same polarity where they are of different values, the polarity of which is dependent on whether the reference signal is greater or less than the portion of the overall combined output fed to the loop circuit.

5. The converter circuit of claim 4 wherein said control means comprise logic circuit units responsive to said various voltages at said tap-off points for operating said buck-boost circuit into the proper one of said output conditions to approach a more ideal sinusoidal waveform.

6. The converter circuit of claim 4 wherein the value of the buck-boost circuit added to the outputs of said inverter circuits are of a value to produce an overall combined output which alternates on opposite sides of the ideal desired output and at a relatively high frequency to produce a ripple waveform.

7. The converter circuit of claim 6 wherein said converter circuit further includes means for separating the ripple component of said resultant output signal and feeding the same between said intermediate impedance point of said converter circuit and said common point whereby to increase the ripple frequency rate and to decrease the deviation of said ripple from the ideal desired output.

8. The converter circuit of claim 1 wherein there is provided means responsive to the average value of said overall combined output of the converter circuit for varying the peak amplitude of said reference signal in a direction to stabilize the average value of the converter circuit output.

9. The converter circuit of claim 5 wherein said logic circuit comprises a pair of operational amplifiers each having a negative and a positive input terminal and an output terminal at which a 1 binary signal appears when the positive input terminal is positive with respect to the negative input terminal thereof and a 0 binary signal appears when the positive input terminal is negative with respect to the associated negative input terminal thereof, means respectively coupling the positive input terminal of one of said operational amplifiers and the negative input terminal of the other operational amplifier to said common point, means coupling one of said tap-off points to the positive input terminal of the operational amplifier whose negative input terminal is connected to said common point and coupling the other tap-off point to the negative input terminal of the operational amplifier whose positive input terminal is connected to said common point, a pair of "AND" gates each with a pair of input terminals one of which is coupled to the output terminal of a different one of said operational amplifiers, an exclusive "OR" gate having a pair of inputs respectively coupled to said output terminals of said operational amplifiers, an inverter having an output where the binary signal is the inverse to that fed to its input, the output of said exclusive "OR" gate being connected to the other input terminals of said "AND" gates and to the input of said inverter whereby a 1 binary signal appears at the output of said "AND" gates and said inverter circuit when the signal conditions call for boost, buck and bypass operations respectively, and said buck-boost circuit includes 1 binary signal responsive means for carrying out the required boost, buck and bypass operations.

10. The converter circuit of claim 1 wherein the outputs of said buck-boost circuit during the first and second output conditions thereof are a small fraction of the peak value of the output of said inverter circuit means, whereby the buck-boost circuit provides a small fraction of the power generated by the converter circuit.

11. The converter circuit of claim 1 wherein the voltage produced by the buck-boost circuit is less than 20 percent of the peak value of the output of the inverter means.

12. The converter circuit of claim 1 wherein said DC voltage source means are unregulated.

13. The converter circuit of claim 1 wherein said inverter circuit means produces a stepped sinusoidal-like waveform which alternates above and below the ideal sinusoidal waveform, whereby said buck-boost circuit fills in the gaps between the steps produced by said inverter circuit means.

14. The converter circuit of claim 1 wherein the combined outputs of said inverter circuit means and any filter means associated therewith produce an ideal sinusoidal waveform under normal circuit operating conditions, so that said buck-boost circuit normally operates in said third output condition, said buck-boost circuit becoming operative primarily only under transient or varying load conditions which effect variations in the output of the inverter circuit means.

15. The converter circuit of claim 1 wherein the output of said reference signal source and the portion of said combined output compared thereto are only a small fraction of said combined output of said inverter circuit means, so that the comparator and control means operate at relatively low voltage levels.

16. The converter circuit of claim 9 wherein said buck-boost circuit includes Schmitt trigger circuits coupled respectively to the outputs of said "AND" and exclusive "OR" gates for continuing the signal generated by said gates for a given finite period independently of the time duration of the outputs of said gates.

17. A converter circuit for providing a regulated sinusoidal-like output voltage under varying load current conditions from DC, said converter circuit comprising, in combination: DC voltage source means capable of delivering a given level of electric power, a source of a reference signal having the desired sinusoidal-like waveform, stepped sinusoidal waveform generating means for providing a stepped waveform output which approaches said desired sinusoidal-like waveform, a buck-boost circuit having a first output condition where the output thereof is a first finite signal of one polarity which is a small fraction of the maximum amplitude of said output, a second output condition where the output thereof is a second finite signal of the same amplitude but opposite polarity to said first finite signal, and a third output condition where the output thereof is zero, means for adding the output of said buck-boost circuit to the output of said stepped sinusoidal waveform generating means to produce an overall combined output, comparator means for comparing said reference signal and at least a part of said overall combined output of said stepped sinusoidal waveform generating means and buck-boost circuit having an amplitude comparable to said reference signal, and control means responsive to said comparator means for operating said buck-boost circuit into one of said output conditions for a desired period which brings said overall resultant output toward the instantaneous level of the desired sinusoidal-like output.

* * * * *